UNITED STATES PATENT OFFICE.

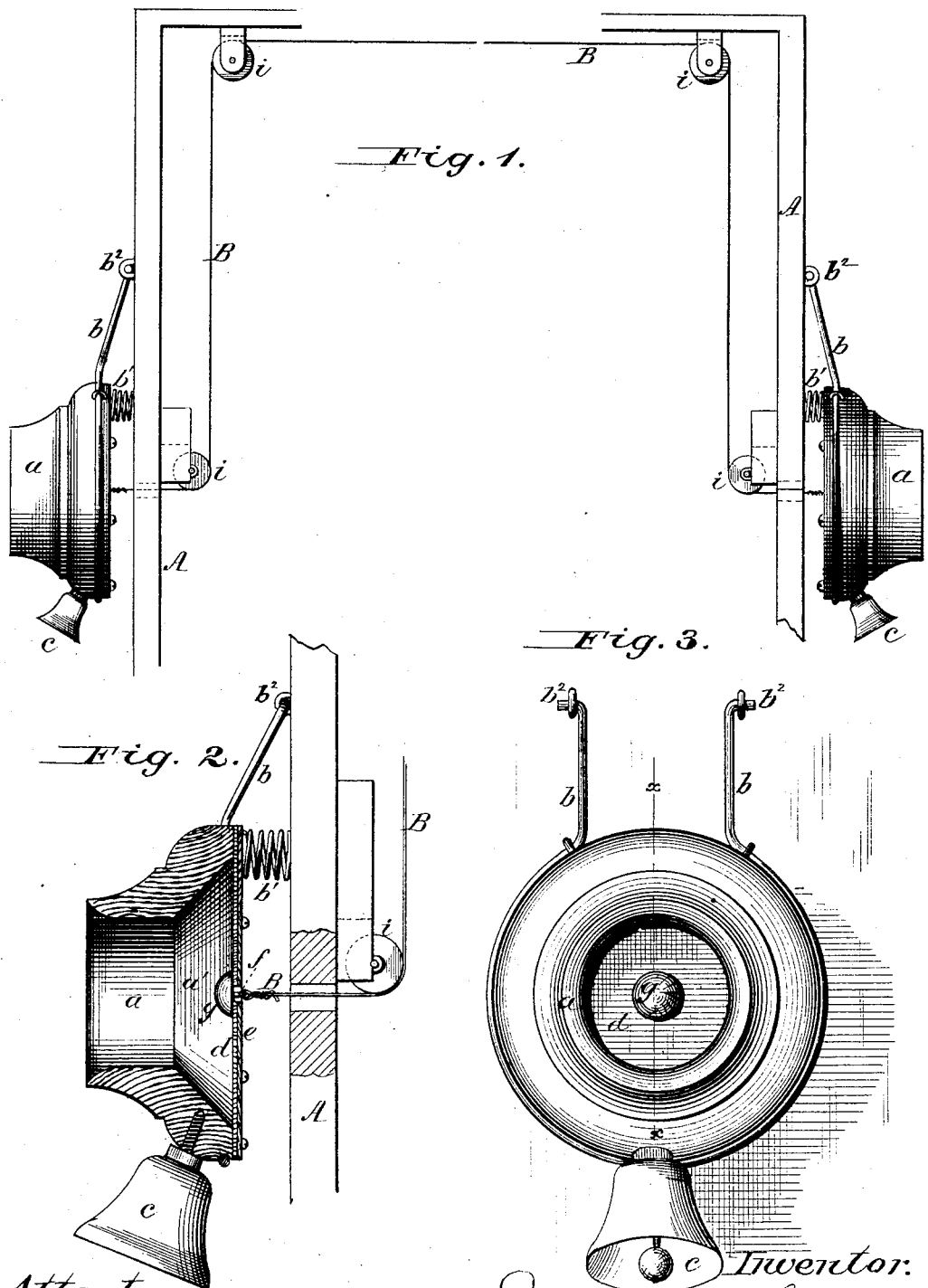

JAMES W. CLARK, OF KIRKERSVILLE, OHIO, ASSIGNOR OF TWO-THIRDS TO JOHN ALGEO AND OWEN KELLY, OF SAME PLACE.

TELEPHONE.

SPECIFICATION forming part of Letters Patent No. 242,600, dated June 7, 1881.

Application filed April 7, 1880. (No model.)

*To all whom it may concern:*

Be it known that I, JAMES WILLSON CLARK, of Kirkersville, in the county of Licking and State of Ohio, have invented certain new and useful Improvements in Telephones, of which the following is a specification.

My invention relates to improvements in acoustic telephones in which the speaking and hearing chambers are bell-mouths of circular section, the sound-boards or diaphragms of which are centrally connected by the vocal cord, and the vibrations of sound transmitted by its conductivity.

The objects of my improvements are to provide means for making the call or giving the signal by the direct vibrations of the connected cups; to effect and control the vibrations of one cup by the vibrations of the other; to make the call, or to ring the call or make the signal and to answer the same, by the direct vibrations of one cup transmitted to the other cup through the movement of the vocal wire or cord; to produce a more durable and effective sound-board or diaphragm, and to render the transmission of sound more distinct.

Referring to the accompanying drawings, Figure 1 represents the connected telephone-cups in elevation, and illustrating my invention of transmitting the vibrations of one cup to the other cup through the movement of the cord to make the call and to answer said call; Fig. 2, a vertical cross-section of one of the cups enlarged, to show the double cross-grained wooden diaphragm or sound-board; and Fig. 3, an end view of one of the cups with its bell and yielding attachments.

The speaking and hearing cups or chambers $a$ are mounted upon springs or yielding attachments $b$, which may be arranged in any manner so long as they serve as the means of suspending the cups or of supporting them with capacity for being vibrated with and in the line of the vocal cord or wire. As shown, the cups are attached to and supported by yoke suspension-springs and by one or more coil or cushioning springs, $b'$, at the back of each cup, so as to maintain the latter at a sufficient distance from the supporting-wall A to give room or play for the proper movement of the cups with their connected vocal cord or wire, the action of said springs being such as to constantly exert an opposing force not only to maintain the tautness of the vocal wire, but the cups away from the supporting-wall. Each cup is provided with a bell, $c$, preferably rigidly attached to the cup, and at the lower part thereof, in order that the vibrations of the cups will ring the bells at each end of the line, and thus operate the call or signal and the answer thereto; but the bell may be attached to the wall and operated by suitable connection with the movable cup. Any suitable call may be used in place of the bell so long as its action is effected and controlled by the simultaneous action or movement of the cups.

The cups are formed, in the usual manner, with sound-chambers $a'$ and diaphragms or backs, which form the sounding-boards; but I make these sounding-boards of double thickness—that is, of two or more thin layers of wood, $d\ e$, glued together with the grain of one crosswise that of the other. As the vocal wire or cord B is secured to the cups by the sound-boards, it is of great importance that they should be strong and tough, to withstand the tension of the vocal cord or wire and the vibrating or pulling action of the cups, and by making them of united thin layers they cannot split at the central perforations, $f$, through which the vocal wire passes, and over which the wire-securing button $g$ is placed and bears upon the sound-board. The cup and its sound-board should be of the same kind of wood, to prevent the clashing of vibrations, and the united layers of the diaphragm should also be glued to the cup and additionally secured by screws.

As under my improvement the vocal wire is free to yield with its connected cups, and therefore is not subject to contraction and expansion between unyielding points of connection, I am enabled to use pulleys $i$ for the vocal wire in turning corners or angles, and I have found that the pulleys do not detract as much from the sound as springs or hangers. I prefer to make the pulleys of wood and to mount them on as small bearings as possible, so that while affording a safe bearing for the line they turn with the least movement of the line. In fact, the wooden pulleys for the wire, the wooden sound-board of united layers, and a vocal line adapted to have a movement with and controlled by the movement of the cups constitute a very important part of my invention.

The connection of the wire with the sound-boards may be made by keys which have merely a line-bearing.

To use the telephone it is only necessary to press or pull upon the cup and release it quickly, when, by reason of its spring-connection, it will instantly rebound, and, pulling the line with it, vibrate or shake the cup at its opposite end, which rings the bell, and the call being answered in the same manner, the conversation takes place as in other acoustic telephones. The bell should be so placed or connected that the least vibration or movement of one cup will give the signal at the other cup, and it will be understood that the movement of one cup to make the call may be made without regard to the action of the springs of either cup, in which case the speaking and hearing cups will serve also as bell-pulls.

Referring to the speaking and hearing cup with a sound-board or diaphragm of two or more layers or thicknesses of thin wood united with the grain of one crossing that of the other, it is important to notice that such construction not only gives the requisite strength to resist the tension of the wire, but serves other and equally important functions in a telephone—viz., it retains its plane or flat form under the strain of the wire, and is therefore more sensitive by giving a more instantaneous diffusion or fullness in receiving and giving out sound than would be the case with a concaved or curved surface, made so under the tension of the wire. It transmits the full volume of the sound, and therefore increases the distinctness of the sound-vibrations.

Referring to the capacity of the speaking and hearing cups for being vibrated by the vocal line, it is important to render the cups as sensitive as possible to make the call by the lengthwise movement of the line, and for this purpose the cups are hung by the yokes $b$, forming pivots $b^2$ at their fixed points of attachment, which should be a sufficient distance above said cups to allow them perfect freedom for their vibration by the slightest lengthwise movement of the line; and in order that the least vibration of the cups will effect the call, the bells should be attached directly to the cups and at points farthest from their pivot-supports, so as to obtain the fullest effect of such vibration to sound the call. In this particular the pivoted hangers for the cups offer the least resistance to such vibrations and give highly satisfactory results in a telephone adapted for making the call without the aid of a magnet.

I do not claim, broadly, the combination of the receiving and hearing cups mounted or supported upon yielding connections with a call or signal device operated by the movement of the line; but the pivoting of the cups, by which they are rendered highly sensitive to the movement of the line, and attaching the call device directly to the cups at points below their pivot-supports, gives advantages not possible in a non-pivotal connection of the cups.

I claim—

1. In an acoustic telephone, the speaking and hearing cups mounted upon pivoted hangers, substantially as described, for the purpose of effecting a sensitive action of the call, as specified.

2. In an acoustic telephone, the speaking and hearing cups mounted upon pivoted hangers, and having the signal device attached directly to the lower side of the cups and below their pivot-points, substantially as described, for the purpose specified.

3. The combination, in an acoustic telephone, of a vocal line, with the pivoted speaking and hearing cups provided with signals, and diaphragms of two or more layers of wood united, the grain of one crossing that of the other, and the cup-springs, the said cross-grain diaphragms serving to resist the tension of the cup-springs, to intensify the sound-waves at the transmitting-point of the line and within the hearing-cup, substantially as described.

4. The combination of the speaking and hearing cups mounted or supported upon yielding connections, substantially as herein set forth, with the line-supporting pulleys, and a call or signal device operated by the vibration of the cups effected and controlled by the movement of the vocal line.

5. The combination, in an acoustic telephone, of the speaking and hearing cups mounted upon pivoted hangers, and provided with a signal device, substantially as described, with springs $b'$, interposed between the backs of the cups and below their pivot-supports, substantially as described, for the purpose specified.

In testimony whereof I have hereunto set my hand in the presence of two subscribing witnesses.

JAMES WILLSON CLARK.

Witnesses:
 J. V. HILLIARD,
 M. L. KELLY.